May 6, 1930.  J. F. HOFFMAN  1,757,248

AUTOMATIC CONTROL VALVE

Filed Feb. 23, 1928

INVENTOR.
John F. Hoffman
BY
ATTORNEYS.

Patented May 6, 1930

1,757,248

UNITED STATES PATENT OFFICE

JOHN F. HOFFMAN, OF OMAHA, NEBRASKA, ASSIGNOR TO BAKER ICE MACHINE CO. INC., OF OMAHA, NEBRASKA, A CORPORATION OF NEBRASKA

AUTOMATIC CONTROL VALVE

Application filed February 23, 1928. Serial No. 256,455.

My invention relates to valves and more particularly to liquid valves of the diaphragm type, the principal object of the invention being to automatically control the valve-actuating agent.

Further objects are to actuate a valve by a body of fluid separate from the fluid passing through the controlled flow line, to provide means for heating said separate body of fluid, and to control the heating thereof by thermostatic means.

In accomplishing these and other objects of the invention I have provided improved details of structure, the preferred forms of which are illustrated in the accompanying drawings, wherein.

Figure 1:
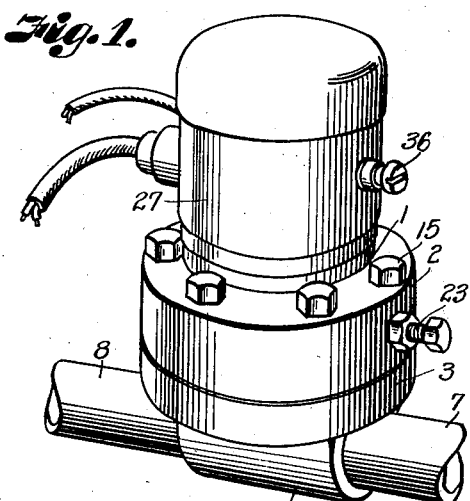
Fig. 1 is a perspective view of the device interposed in a flow line.
Figure 2:
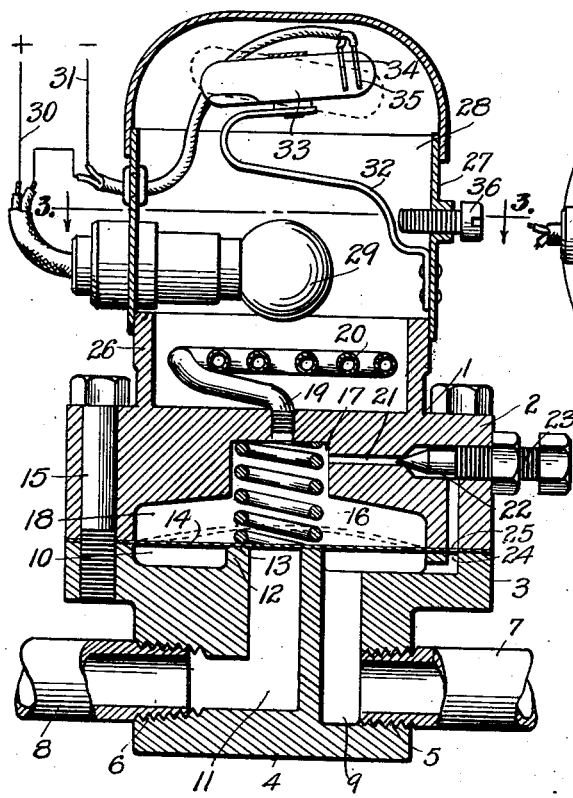
Fig. 2 is an enlarged vertical longitudinal sectional view.
Figure 3:
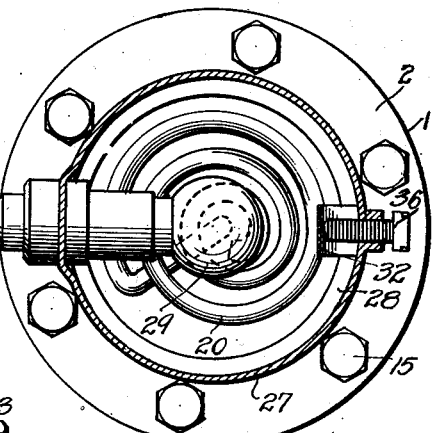
Fig. 3 is a cross section on the line 3—3, Fig. 2.

Referring in detail to the drawings:

1 designates a housing comprising upper and lower portions 2 and 3, the lower portion having a transverse tubular boss 4 provided with threaded inlet and outlet openings 5 and 6 to receive the spaced ends 7 and 8 of a flow line whereby the housing is interposed in the flow line. The inlet opening 5 is connected by an inlet channel 9 with an annular recess 10 in the lower member, and an axial outlet channel 11 therein extends through a boss 12 that constitutes the inner wall of the recess and provides a seat 13 for a flexible diaphragm 14 positioned between the members 2 and 3 and peripherally retained thereby when the members are fixed together by bolts 15 to normally close the outlet channel. The fluid flowing through the flow line is restrained in the annular recess 10 of the lower member by the seated diaphragm and is permitted to flow over the seat 13 into the outlet channel 11 when the diaphragm moves away from the seat, the pressure of the liquid in the flow line tending to move the diaphragm away from outlet closing position. The diaphragm is retained on its seat to stop flow by a spring 16 extending in a recess 17 of the upper member 2, and the member is further provided with an enlarged recess portion 18 comprising a pressure chamber above the diaphragm.

I provide fluid means for the chief element of control of the flexible diaphragm, and conduct an expansible fluid into the chamber 18 of the upper member above the diaphragm through a pipe 19 inserted into the upper member. The pipe leads from a coil 20 supported by the housing. Fluid is admitted to the chamber 18 and the coil for serving as the expansible pressure agent, through a bore 21 having a needle valve member 22 integral with a screw 23 engaged with the housing. The device is preferably used in connection with an ammonia flow line, and is so illustrated, in such use the bore 21 communicating through a passage 24 in the housing with the inlet channel 9 for admission of ammonia gas to the pressure chamber. The diaphragm is provided with an opening 25 coinciding with the passage 24, to permit passage of the gas.

A cylindrical flange 26 of the housing surrounds the coil and supports a casing 27 providing a relatively sealed chamber 28 within which is positioned an electric globe 29 actuated through circuit wires 30 and 31. The globe is positioned adjacent the coil and when energized, heats the coil and the contained fluid for expanding the fluid for movement into the chamber 18 to increase the resistance of the diaphragm to pressure of liquid tending to flow through the housing. A thermostatic device comprising a bar 32 on which is mounted a mercury switch 33 having terminals 34 and 35 fixed therein, is supported in spaced relation to the globe and adapted for tilting of the mercury tube to make and break the circuit to the globe upon heating of the bar 32 and the cooling of the same. A set screw 36 limits the movement of the bar 32.

In operating the device, the heating element is provided of a character suitable for a particular use of the device, and the thermostatic element is also adapted for the particular service and adjusted to the service by the set screw 36. A suitable amount of the fluid for actuation by the heating element is introduced into the coil and pressure chamber. The heating element expands the fluid in the coil, which in turn bears against the diaphragm to prevent flow of liquid through the housing and onward in the flow line. The fluid is retained in the chamber and coil by the valve 22 which is closed after admission of the supply. When the heating element has heated the coil and fluid for a predetermined period or to a predetermined degree, the chamber and other elements are similarly heated and the thermostatic element becomes operative to suspend the supply of current to the globe. The fluid is, therefore, prevented from overheating, and is permitted to cool, meanwhile maintaining its influence on the diaphragm, which with the normal resistance of the spring-retained diaphragm to the pressure of liquid in the flow line permits the predetermined amount of fluid to pass through the housing onwardly in the flow line. The period of cooling may be predetermined and when the chamber 28 and heater have cooled sufficiently, the thermostatic element will again be oppositely actuated and automatically reconnect the circuit and cause the resumption of supply of current to the globe. Overheating of the coil and fluid, and consequent excessive pressure on the diaphragm, are thus avoided, by automatic means.

The valve 22 is easily manipulatable to admit additional supplies of fluid to the expansion and pressure chamber and coil at any time.

What I claim and desire to secure by Letters Patent is:

1. In a thermostatic control device, a housing having a fluid containing chamber and a chamber provided with inlet and outlet ports, a diaphragm separating said chamber and adapted to close one of said ports, said housing having a bore for conducting fluid to the fluid containing chamber, and means for heating the fluid to expand the same to urge the diaphragm toward port closing position.

2. In a thermostatic control device, a housing having a fluid-containing chamber, a flexible valve receiving the pressure of the fluid in the chamber, heating means for expanding the fluid to bear against the valve including an electrical circuit, and heat-operated means responsive to the changes of temperature of said heating means for making and breaking the circuit.

3. In combination with a flow line, a thermostatic control device comprising a housing interposed in the flow line having a fluid-receiving recess and inlet and outlet channels communicating the recess with the flow line, a diaphragm normally closing the outlet and stopping flow through the flow line, and means including a spring and a heat-responsive member controlling the movement of the diaphragm.

4. In combination with a flow line, a thermostatic control device comprising a housing interposed in the flow line having a fluid-receiving recess and inlet and outlet channels communicating the recess with the flow line, a diaphragm normally closing the outlet, a spring urging the diaphragm against the flow through the flow line, and heat-responsive means including a fluid-containing coil re-enforcing the action of the spring.

5. In combination with a flow line, a thermostatic device for controlling flow of liquid through the flow line including a housing interposed in the line, a flexible valve normally intercepting flow through the housing and movable by pressure of liquid in the line away from flow-intercepting position, and means for retaining the valve in normal position including means for containing an expansible fluid in contact with the valve to operate against the pressure of said liquid, electric fluid-expanding means, and heat-responsive means actuatable by said fluid-expanding means for suspending the actuation of the fluid-expanding means.

6. In a thermostatic device for the purpose set forth, a housing, a control member supported by the housing including a pressure chamber and a flexible diaphragm movable against pressure of fluid in the chamber, a heating casing supported by the housing, a fluid-containing coil in said casing connected into said chamber, heating means in said casing, and means responsive to changes of temperature of the heating means controlling the operation of the heating means.

In testimony whereof I affix my signature.

JOHN F. HOFFMAN.